Aug. 14, 1928.

W. H. EVANS 1,680,510

VALVE SEAT REAMER

Filed Nov. 27, 1925     2 Sheets-Sheet 1

Inventor.
Wm. H. Evans.
by Max W Zabel
Atty.

Aug. 14, 1928.

W. H. EVANS 1,680,510

VALVE SEAT REAMER

Filed Nov. 27, 1925      2 Sheets-Sheet 2

Inventor
Wm. H. Evans.
by Max W Zabel Atty.

Patented Aug. 14, 1928.

1,680,510

UNITED STATES PATENT OFFICE.

WILLIAM H. EVANS, OF CHICAGO, ILLINOIS, ASSIGNOR TO EVANS FLEXIBLE REAMER CORPORATION, OF CHICAGO, ILLINOIS, A CORPORATION OF ILLINOIS.

VALVE-SEAT REAMER.

Application filed November 27, 1925. Serial No. 71,682.

My invention relates to reaming tools, and more particularly to a valve-seat reamer for reaming the valve seats of engines.

It is a purpose of my invention to provide a reamer that will not cause chattering, which often seriously damages a valve seat by making a rough and uneven cut that is too deep in certain places, instead of a smooth cut, thus damaging the valve seat to such an extent that it is very difficult to again make the same as smooth as is desirable.

It is another purpose of my invention to provide a reamer made out of a metal stamping that is provided with thin, flexible teeth to prevent chattering of the reamer. The teeth are preferably so made that the same will yield to a certain extent when they tend to cut too deeply, thus causing the same to spring away from the surface instead of digging into the same. This causes a smooth, even cut by the reamer, instead of a rough cut such as ordinarily is of frequent occurrence.

The teeth are not only made so as to yield within certain limits, but are so positioned that this yielding will take place in such a way as to move the teeth away from the surface operated on when a tendency to chatter occurs. In order to accomplish this, the teeth are inclined backwardly from the base thereof to the cutting edges thereof, so that as the reamer is rotated in the usual direction the cutting edges lie further back than the base portions of the teeth during such rotation. Accordingly, if the teeth tend to catch in the material, the same will be swung further backward and out of engagement with the material.

It has been further found that the body portion of the cutter should also be yieldable in order to obtain a smooth cut from the reamer and prevent chattering, and, furthermore, the cutter as a whole is most satisfactory when yieldably mounted upon a supporting member that accommodates the shank of the tool.

It has been further found that in order to make the reamer cut smoothly and evenly over the entire valve seat, the above-mentioned teeth should be arranged in two series, each occupying substantially half of the cutter, one series being inclined in one direction relative to the radial and the other in the opposite direction relative to the radial. Thus, the one set of teeth has its outer edges in advance of its inner edges as it rotates, and the other set has its inner edges in advance of its outer edges as it rotates. In this manner, if the one set of teeth fails to cut properly because of the inclination thereof, the other set, due to its opposite inclination, completes the cut.

The yielding mounting for the cutter member is preferably obtained by securing the cutter member to the supporting member at spaced points, preferably diametrically opposite each other, and having the rest of the cutter member cut away adjacent the support to space the same from the supporting member to provide sufficient clearance to allow for movement of the cutter member relative to the support. Furthermore, the amount of material cut away may be varied to vary the yieldability of the body portion of the cutter. Thus, by cutting away the proper amount of material from the body portion of the cutter together with hardening it to leave a soft core, the desired flexibility is obtained. By providing such flexibility, the cutting edge can be made og extreme hardness without flaking or chipping off. By providing such an extremely hard cutting edge, the reamer can be made to go through any hard surface without becoming dull.

It has been found that a certain degree of resilience can be obtained by pack-hardening that is the most desirable for both the body portion of the cutter member and the teeth. This hardening process is carried out to an extent so that the entire material is not hardened, but only the entire surface is hardened inwardly to a depth so as to leave a core or layer of softer material. This produces a hard cutting surface, and the combination of the hardened outer surface with the softer core produces a tooth of the desired yieldability, as well as the body portion of the desired yieldability that can only be obtained by pack-hardening a sheet-metal member.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings,—

Figure 2:
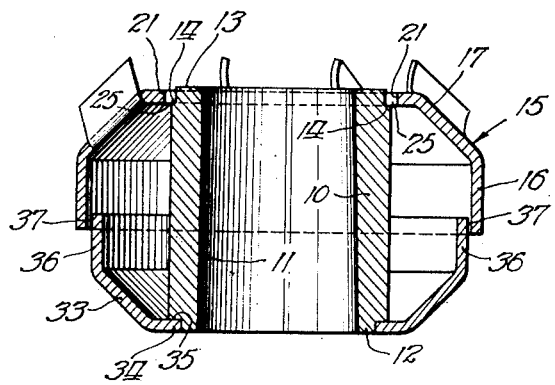
Fig. 2 is a section taken on the line 2—2 of Fig. 1.
Figure 5:
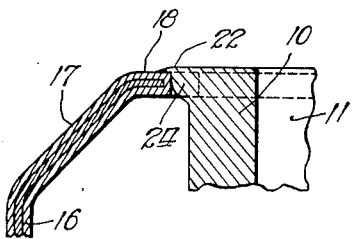
Fig. 5 is a fragmentary sectional view taken on the line 5—5 of Fig. 1.
Figure 6:
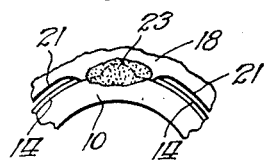
Fig. 6 is a fragmentary plan view of a modified construction.

Referring in detail to the drawings, the reamer shown therein is mounted, as is usually the case, upon a suitable spindle or shank portion that enters a bore to properly align the reamer with the valve seat. To provide a mounting for the reamer on such a spindle, the reamer is provided with a metallic supporting member of rigid material, indicated by the numeral 10, which is provided with a bore 11 which is tapered toward the end 12 of the member 10 to accommodate the above-mentioned spindle or shank portion. The opposite end 13 of the member 10 is provided with an annular shoulder at 14 which supports the cutter member of sheet-metal indicated by the numeral 15 in a manner to be described below. Said cutter member is provided with a substantially cylindrical portion 16, a substantially conical portion 17, and a substantially flat end wall or inturned flange portion 18. The end wall or flange portion 18 is provided with oppositely arranged paired projections 19 between which are the recesses 20; or, in other words, the flange 18 is cut away as indicated at 21 so as to leave the projecting portions 19. These projecting portions 19 engage with the shoulder 14, while the portions 21 are spaced therefrom as indicated in Fig. 2. Thus the cutter member 15 engages only at the projecting portions 19 with the member 10. The cutter member is secured to the member 10 at the projecting portions 19 by either upsetting or riveting the end 13 at said projections, as indicated at 22, or by spot-welding the parts together at said projections, as indicated at 23 in Fig. 6. It will be seen from Fig. 5 that the upset or riveted portion 22 causes the formation of a projection, as at 24, entering the opening 20, and that the upset material 22 extends over the flange 18 to clamp the flange 18 to the shoulder 14 at said portions 22. It will also be noted from Fig. 2 that a space indicated by the numeral 25 is provided into the interior of the cutter 15 between the cut-away portions 21 and the shoulder 14, thus permitting any material that might otherwise lodge in the space between the members 15 and 10 at the shoulder 14 to drop through into the interior of the cutter. This permits of absolute freedom of movement of the cutter 15 relative to the member 10 at all points except at the points of securement at the projections 19, which are preferably arranged diametrically opposite each other.

Figure 1:
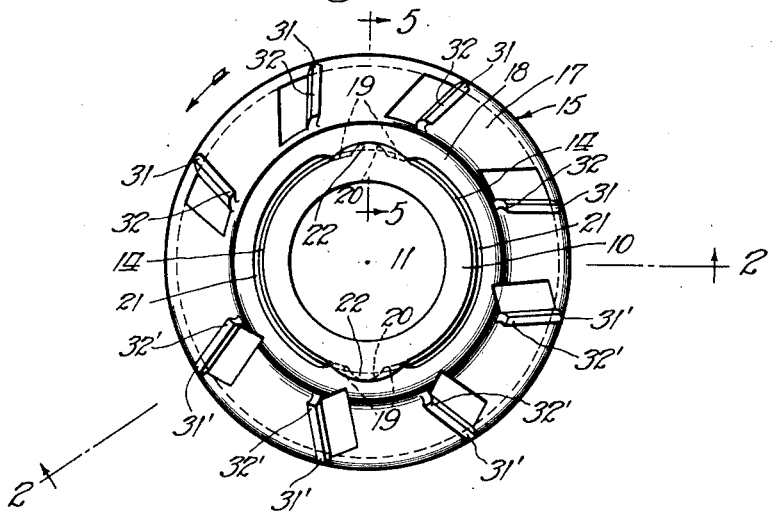
Fig. 1 is a plan view of my improved reamer as viewed from the side thereof provided with the teeth.
Figure 3:
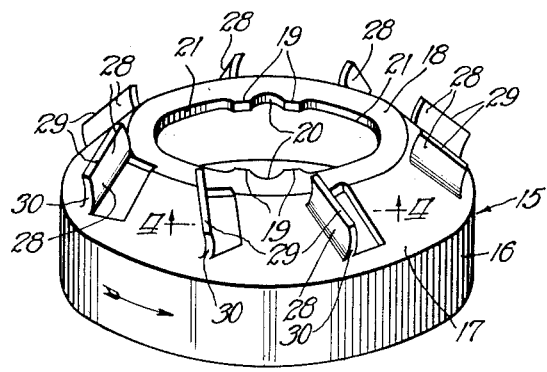
Fig. 3 is a perspective view of the cutter member.
Figure 4:
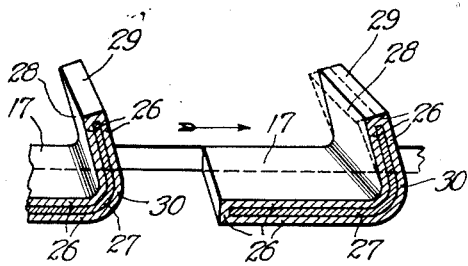
Fig. 4 is a very much enlarged section through portions of adjoining teeth taken substantially on the line 4—4 of Fig. 3.

This freedom of the cutter member 15 relative to the supporting member 10 allows the cutter member as a whole to yield relative to the supporting member, and being made of a material having a certain degree of flexibility, this provides a flexible mounting for the cutter member and the teeth thereof. In order to obtain the desired flexibilty of the cutter member, the same is made of sheet-metal, as mentioned above, and is treated by what is known as the pack-hardening process, so as to harden the entire outer surface of the cutter member, as indicated in Fig. 4 by the numeral 26, this hardening process being carried to such a point only that a core 27 of soft steel is left in the center thereof. It has been found that by providing the hardened surface with a soft core a degree of resiliency is obtained so as to obtain a slight yielding of the cutter member and the teeth 28 thereof, and at the same time the cutting edges 29 of the teeth are extremely hard. While said cutting edges are extremely hard, there is no chipping thereof, as would be the case with rigid teeth, because of the yieldability of said teeth 28. The teeth 28 are yieldable not only because of the internal structure thereof, but because of the angle at which the same extend relative to the face 17 of the cutter. Instead of being perpendicular to the conical face 17 of the cutter, the teeth 28 are inclined at an acute angle to the face 17, as will be obvious from Fig. 4. Said teeth are, of course, punched out or struck out, as will be obvious from Figs. 1, 3 and 4, and inclined so that the cutting edges 29 thereof are rearwardly of the bases 30 thereof, the expressions "forwardly" and "rearwardly" in this case being used to mean forwardly and rearwardly relative to the direction of movement of the cutter, which is indicated by the arrow in Figs. 1, 3 and 4. Thus, it will be seen that, if there is any unusual pressure on any tooth 28, it will be bent back slightly, as indicated in dotted lines in Fig. 4, the amount of bending in Fig. 4 being slightly exaggerated to more clearly indicate the same. Upon reference to Fig. 1, it will be furthermore seen that the teeth shown in the upper half of said figure are arranged so that the outer ends 31 thereof lie rearwardly of the inner ends 32 thereof relative to the radial, while the teeth 28 in the lower half of Fig. 1 are arranged so as to incline in an opposite direction relative to the radial, so that the outer ends 31' of said teeth lie forwardly of the inner ends 32' thereof. The result of this arrangement of the teeth is that one half of the teeth first cut on the inner ends of their cutting edges, while the other half cut first at the outer ends of their cutting edges. It has been found that with this arrangement the teeth as a whole will produce an extremely smooth cut. The action is substantially as follows: If a tooth of the set shown in the upper half of Fig. 1 does not produce a smooth and even cut throughout the width of the cutting face thereof, one of the teeth of the other set will compensate for this and complete the cut, or vice versa.

The supporting member 10 is provided with a hollow sheet-metal cap member 33 which has a flange portion 34 engaging with a shoulder 35 on the end 12 of the member 10, being secured thereto in any suitable manner, as by riveting or spot-welding, said member 33 being provided with a substantially cylindrical portion 36 which is of smaller diameter than the portion 16 of the cutter 15, to provide for clearance between said members, as indicated at 37 in Fig. 2.

From the above it will be seen that the hardened teeth, which have a certain amount of flexibility because of the fact that they are made of sheet-metal and hardened by the pack-hardening process, will flex away from the material that is being cut if there is any tendency for the teeth to dig into the material or chatter, springing back to normal position after this difficulty has been overcome; and, furthermore, that the cutter will yield relative to the supporting member so as to provide a further flexible mounting for the teeth because of the fact that the supporting member is engaged by the cutter member only at diametrically opposite points, this permitting substantially half of the cutter member on each side of the securing portions to swing away from the work or material on which the cutting is being done.

By cutting away the material at 21, the flexibilty of the cutter member can be varied. Thus, if more material is cut away, the cutter member will be made more yielding, while if less is cut away, the cutter member will be less yielding. By test, the amount of material to be cut away for any particular size cutter member can be determined to get the proper amount of flexibility of the body portion, whereby a sufficient yielding mounting of the hardened teeth is obtained so that the same will spring away from the work in the proper manner when a tendency to chatter occurs. Also, due to such yielding mounting, the teeth can be made much harder than would ordinarily be the case. The cutting portions of the teeth are hardened to an extreme hardness that is commonly known as "glass" hardness, whereby the same will cut through any material that may be on the valve seat no matter how hard to same may be without causing the cutting edges of the teeth to flake or chip.

Having thus described my invention, what I desire to claim and secure by United States Letters Patent is:

1. A cutter head described comprising a hollow arbor and a cutter member yieldingly secured thereto, whereby the entire cutter member may be angularly displaced out of normal position relative to said arbor, said cutter member having an annular portion provided with integral outstruck teeth.

2. A cutter head, comprising a hollow sheet-metal cutter member having integral outstruck teeth thereon, a supporting member therefor and means for securing said cutter member to said supporting member at spaced points adjacent the inner periphery thereof, said cutter member being otherwise free of said supporting member.

3. A cutter head, comprising a support and a yieldable annual cutter member yieldingly mounted thereon, said cutter member having yieldable teeth thereon, said teeth being inclined to the axis of said cutter member with the cutting edges thereof deflected rearwardly of the base portions thereof.

4. A device of the character described, comprising a support and a yieldable annular cutter member yieldingly mounted thereon, said cutter member engaging said support only at spaced points adjacent the inner periphery thereof.

5. A device of the character described, comprising a support and a yieldable annular cutter member yieldingly mounted thereon, said cutter member engaging said support only at spaced points adjacent the inner periphery thereof, there being a clearance between said cutter member and said support at all other points.

6. A device of the character described, comprising a support and a yieldable annular cutter member yieldingly mounted thereon, said cutter member engaging said support only at a pair of substantially diametrically opposed points adjacent the inner periphery thereof.

7. A device of the character described, comprising a support and a yieldable annular cutter member yieldingly mounted thereon, said cutter member engaging said support only at a pair of substantially diametrically opposed points adjacent the inner periphery thereof, there being a clearance between said cutter member and said support at all other points.

8. A cutter head, comprising an annular cutter having a yieldingly mounted portion of flexible material provided with integral outstruck teeth, said teeth being pack-hardened to such a depth as to leave a softer core therein, whereby said teeth are yieldable and still retain a pack hardened cutting edge.

9. A device of the character described, comprising a support and a yieldable cutter member yieldingly mounted thereon, said cutter member engaging said support only at spaced points adjacent the inner periphery thereof, said cutter member having teeth pack-hardened to such a depth as to leave a softer core therein, whereby said teeth are yieldable.

10. A device of the character described, comprising a support and a yieldable cutter member yieldingly mounted thereon, said cutter member engaging said support only at spaced points adjacent the inner periphery thereof, said cutter member comprising a sheet-metal body portion and integral outstruck teeth pack-hardened to such a depth as to leave a softer core therein, whereby said teeth and body portion are yieldable.

11. A device of the character described, comprising a support and a yieldable cutter member yieldingly mounted thereon, said cutter member engaging said support only at spaced points, said cutter member comprising a sheet-metal body portion and integral outstruck teeth pack-hardened to such a depth as to leave a softer core therein, whereby said teeth and body portion are yieldable, the body portion of said cutter member being cut away between the points of engagement thereof with said support to provide the desired degree of flexibility of said body portion.

12. A device of the character described, comprising a support and a yieldable cutter member yieldingly mounted thereon, said cutter member engaging said support only at spaced points, said cutter member having teeth pack-hardened to such a depth as to leave a softer core therein, whereby said teeth are yieldable, said cutter member having a body portion cut away at the unsupported portions thereof to adjust the yieldability of said body portion.

13. A cutter head comprising an arbor, a hollow sheet metal cutter member secured thereto and having an annular portion provided with integral outstruck teeth having their cutting edges inclined rearwardly relative to the base thereof with respect to the direction of rotation, said teeth being pack hardened to such a depth as to leave a softer core therein whereby said teeth are yieldable but retain a pack hardened cutting edge.

In witness whereof, I hereunto subscribe my name this 11th day of November, A. D. 1925.

WILLIAM H. EVANS.